US012649326B2

(12) United States Patent
Kojima

(10) Patent No.: US 12,649,326 B2
(45) Date of Patent: Jun. 9, 2026

(54) PRINTING APPARATUS

(71) Applicant: CANON KABUSHIKI KAISHA, Tokyo (JP)

(72) Inventor: Takahiro Kojima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 18/342,446

(22) Filed: Jun. 27, 2023

(65) Prior Publication Data

US 2023/0416037 A1 Dec. 28, 2023

(30) Foreign Application Priority Data

Jun. 28, 2022 (JP) ................................ 2022-103693

(51) Int. Cl.

*B41J 11/20* (2006.01)
*B41J 2/165* (2006.01)
*B41J 15/16* (2006.01)
*B41J 25/304* (2006.01)
*B41J 25/308* (2006.01)

(52) U.S. Cl.

CPC ........... *B41J 11/20* (2013.01); *B41J 2/16508* (2013.01); *B41J 2/16585* (2013.01); *B41J 15/165* (2013.01); *B41J 25/304* (2013.01); *B41J 25/308* (2013.01)

(58) Field of Classification Search

CPC .... B41J 11/20; B41J 2/16508; B41J 2/16585; B41J 15/165; B41J 25/30; B41J 25/308; B41J 2203/011; B65H 23/1955

See application file for complete search history.

(56) References Cited

U.S. PATENT DOCUMENTS

| | | | | |
|---|---|---|---|---|
| 8,827,398 | B2 | 9/2014 | Oba et al. | |
| 10,814,654 | B2 * | 10/2020 | Takeuchi | B41J 2/04556 |
| 2008/0122889 | A1 * | 5/2008 | Naoi | B41J 29/393 347/16 |
| 2019/0299684 | A1 | 10/2019 | Takeuchi | |

FOREIGN PATENT DOCUMENTS

| | | | | |
|---|---|---|---|---|
| JP | 2009226839 | A * | 10/2009 | B41J 15/16 |
| JP | 2010-111474 | A | 5/2010 | |

OTHER PUBLICATIONS

Extended European Search Report dated Nov. 22, 2023, in European Patent Application No. 23181109.2.

* cited by examiner

*Primary Examiner* — Geoffrey S Mruk
(74) *Attorney, Agent, or Firm* — Venable LLP

(57) ABSTRACT

A printing apparatus includes: a printing head for printing on a printing material; a feeding portion for feeding the printing material from an upstream side of a conveyance path of the printing material toward the printing head; a winding portion for winding a part of the printing material at a downstream side of the conveyance path, the part of the printing material having passed through the printing head; a conveying portion configured to convey the printing material while performing printing on the printing material with the printing head, at a position where the conveying portion is opposed to the printing head; a movement mechanism configured to change an opposing interval between the printing head and the conveying portion; and a detecting portion configured to detect floating of the printing material. The movement mechanism performs a separation operation to widen the opposing interval when the detecting portion detects the floating.

11 Claims, 14 Drawing Sheets

PRINTING APPARATUS

BACKGROUND OF THE INVENTION

Field of the Invention

The present invention relates to an emergency evacuation method performed when floating of a printing material that is being conveyed is detected in a printing apparatus.

Description of the Related Art

Conventionally, with regard to a printing apparatus that conveys and performs printing on a long printing material such as a roll sheet while applying tension, sometimes a phenomenon occurs, in which the printing material floats, due to abnormalities such as faulty conveying or faulty holding, and the printing material bumps into a printing head, hence this may result in failure of the printing head. Japanese Patent Application Publication No. 2010-111474 discloses a configuration in which a guide member for regulating floating of a printing material and units for detecting the floating of the printing material are disposed on an upstream side of a printing head, and in which a convey unit is stopped when the floating of the printing material has been detected.

SUMMARY OF THE INVENTION

However, when the conveying unit is stopped due to the detection of the floating of the printing material while conveying a web of the printing material under tension control, tension applied on the printing material below the printing head may not be maintained. In this case, there is a concern that the printing material passing immediately below the printing head may float due to vibration caused by stopping the conveyance, and the printing material may bump into the printing head, hence this may result in failure of the printing head.

An object of the present invention is to provide a technology that makes it possible to avoid contact between the printing material and the printing head.

To attain the above-described object, the printing apparatus according to the present invention includes:

- a printing head configured to perform printing on a printing material;
- a feeding portion configured to feed the printing material from an upstream side of a conveyance path of the printing material toward the printing head;
- a winding portion configured to wind a part of the printing material at a downstream side of the conveyance path, the part of the printing material having passed through the printing head;
- a conveying portion configured to convey the printing material while performing printing on the printing material with the printing head, at a position where the conveying portion is opposed to the printing head;
- a movement mechanism configured to move at least one of the printing head and the conveying portion and change an opposing interval between the printing head and the conveying portion; and
- a detecting portion configured to detect floating of the printing material, wherein the movement mechanism performs a separation operation to widen the opposing interval in a case where the detecting portion detects the floating.

According to the present invention, it is possible to avoid contact between the printing material and the printing head.

Further features of the present invention will become apparent from the following description of exemplary embodiments with reference to the attached drawings.

DESCRIPTION OF THE EMBODIMENTS

Hereinafter, embodiments of the present invention will be illustratively described in detail on the basis of examples with reference to the drawings. Note that, dimensions, materials, shapes, relative positional relationships, and the like of structural elements described herein should be appropriately changed depending on various conditions and structures of apparatuses to which the present invention is applied. In addition, not all of the combinations of features that are described according to the following embodiments are necessarily required with respect to means to solve problems according to the present invention. The structural elements described according to the embodiments are merely illustrative, and are not intended to limit the scope of the present invention only to them.

First Embodiment

Figure 1:
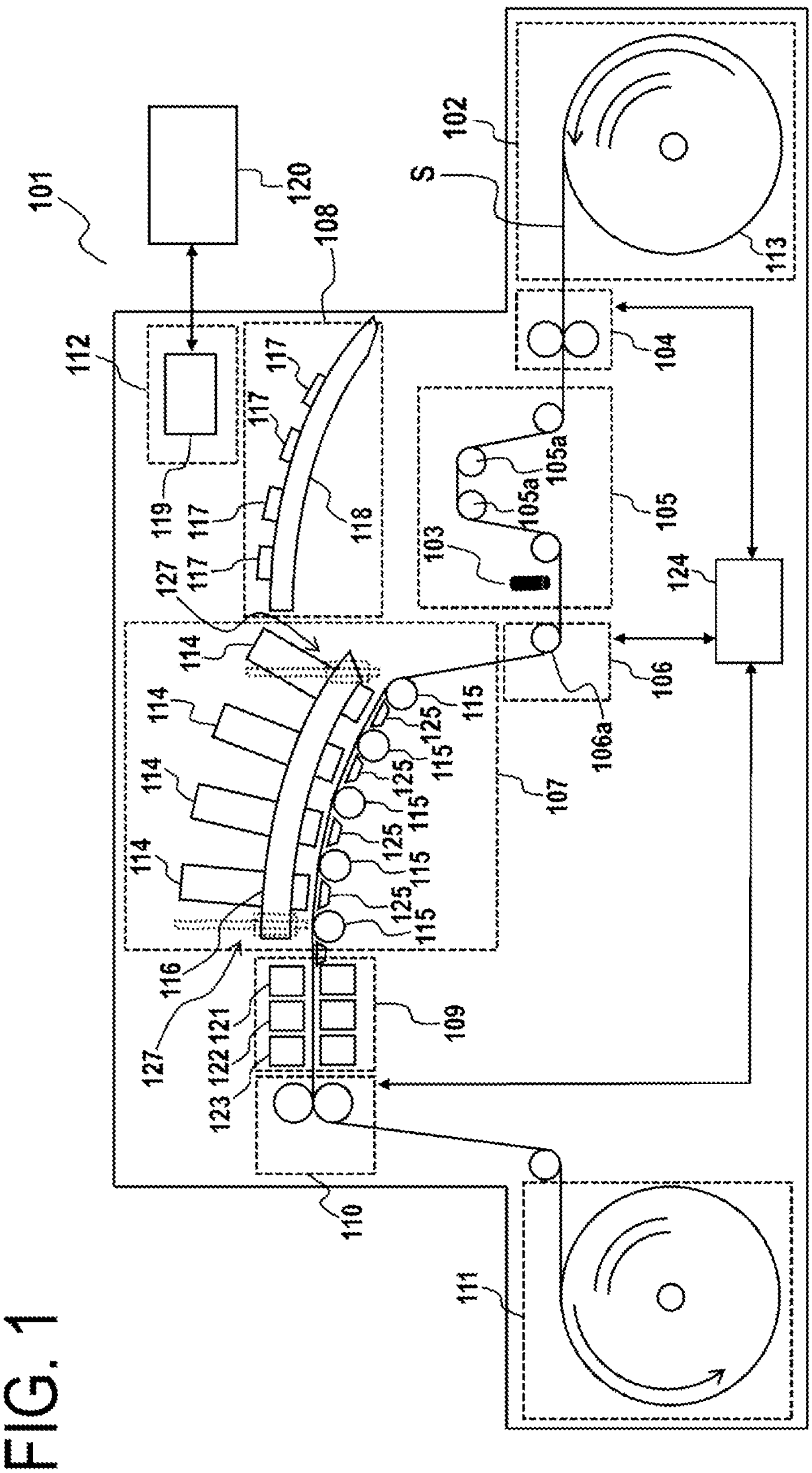
FIG. 1 is a schematic cross-sectional view of a configuration of a printing apparatus during printing according to a first embodiment.

First, it is defined that a sheet serving as a printing material is schematically conveyed from a right side to a left side of paper of FIG. 1 illustrating an apparatus, a top of the paper of FIG. 1 is defined as an upper direction, and a direction from a foreground to a background of the paper of FIG. 1 is defined as a sheet width direction, the direction being perpendicular to a sheet conveyance direction. A printing apparatus 101 according to embodiments of the present invention is a high-speed line printer that uses a continuous sheet that is wound into a roll shape. The present invention is suitable for application to the field of mass printing performed in a print laboratory or the like.

Figure 2:
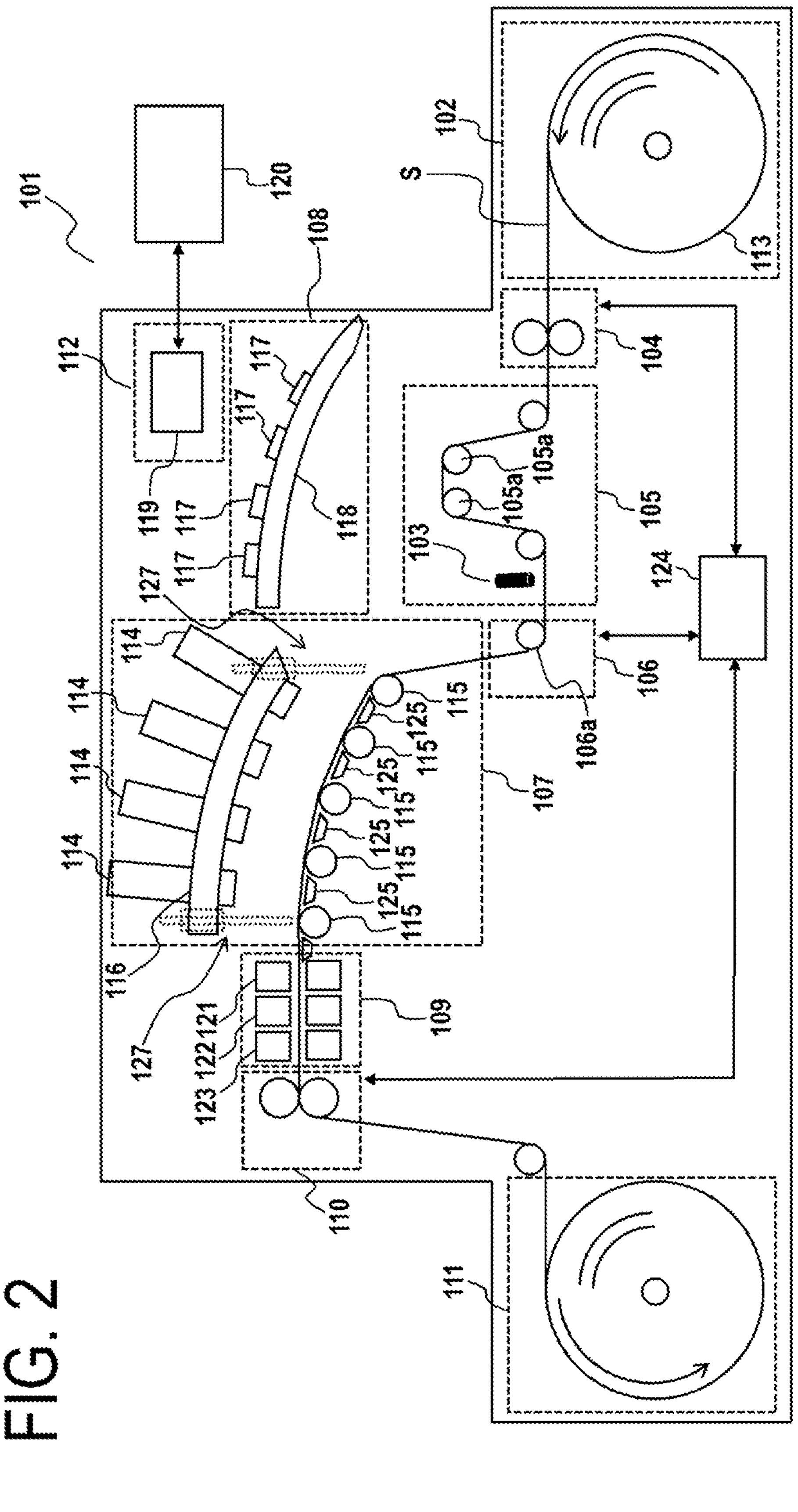
FIG. 2 is a schematic cross-sectional view of a configuration of the printing apparatus during separation according to the first embodiment.
Figure 3:
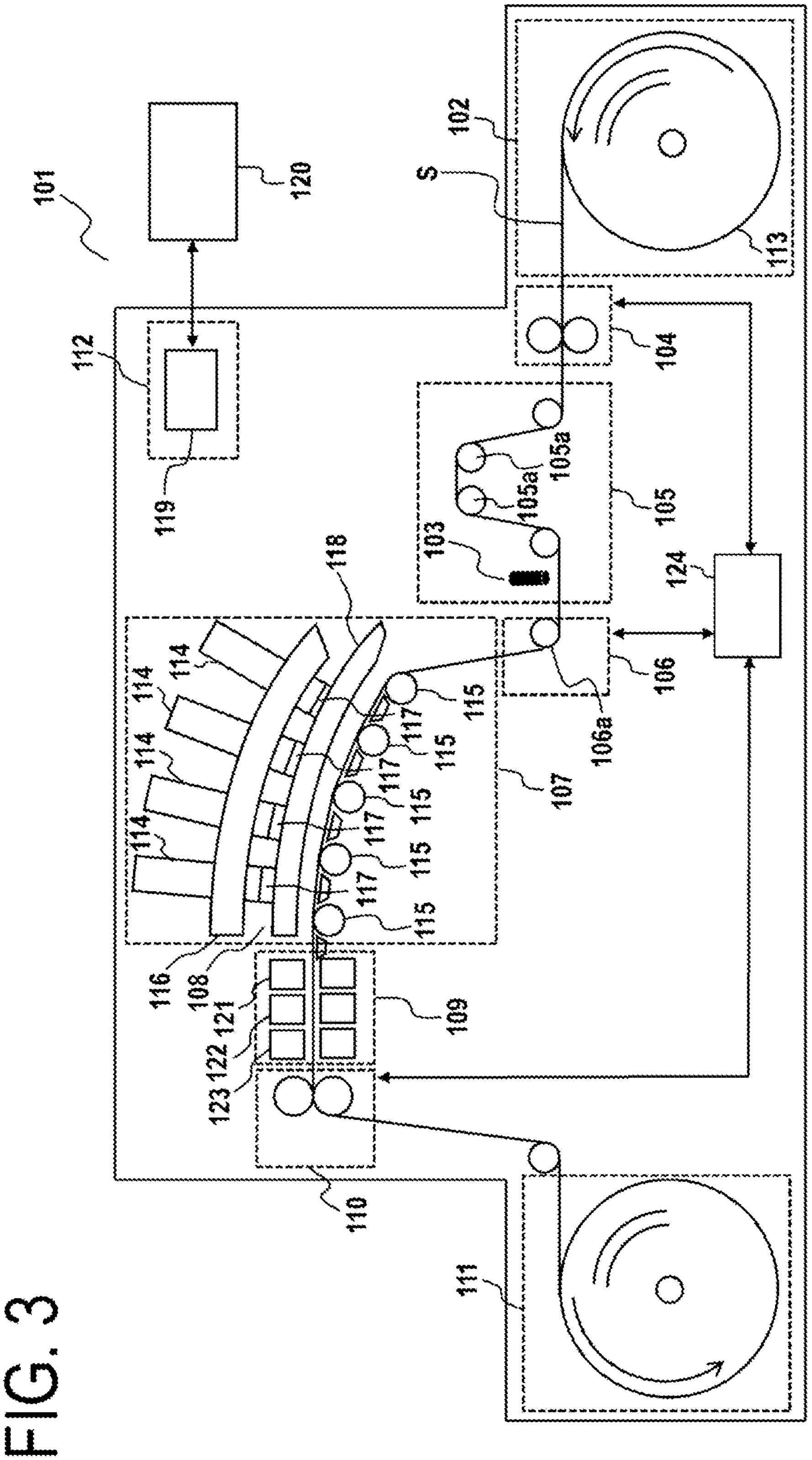
FIG. 3 is a schematic cross-sectional view of a configuration of the printing apparatus during cleaning according to the first embodiment.

FIGS. 1 to 3 are schematic cross-sectional views of configurations of the printing apparatus 101 according to a first embodiment. FIG. 1 is a schematic cross-sectional view of a configuration of the printing apparatus 101 during printing. FIG. 2 is a schematic cross-sectional view of a configuration of the printing apparatus 101 during separation. FIG. 3 is a schematic cross-sectional view of a configuration of the printing apparatus 101 during cleaning.

The printing apparatus 101 according to the present embodiment includes various kinds of units therein. That is, the printing apparatus 101 includes a sheet feeding portion 102, a floating detection sensor 103, a first conveyance roller pair 104, a meander (skew) correcting portion 105, a tension detecting portion 106, and a printing portion 107. The printing apparatus 101 further includes following units: a head cleaning portion 108; a postprocessing portion 109; a second conveyance roller pair 110; a sheet collecting portion 111; and a control portion 112. A sheet S serving as the printing material is conveyed along a sheet conveyance path indicated by a solid line in the drawings, and undergoes processes performed by the respective units.

The sheet feeding portion 102 is a unit (feeding portion) to feed a portion of the sheet S drawn from a roll 113 that is obtained by winding a portion of the continuous sheet S into the roll shape, from an upstream side of the conveyance path of the sheet S to the printing portion 107. The sheet feeding portion 102 is configured to hold and store the roll 113, draw the sheet S, and feed the sheet S to the printing portion 107. Note that, the number of storable rolls is not limited to one. The sheet feeding portion 102 may be configured to store two or three or more rolls, draw a sheet from one of the rolls, and feed the sheet. In addition, the sheet is not limited to the sheet that is wound into the roll shape as long as the sheet is a continuous sheet. For example, a continuous sheet may be provided with perforations per every unit length, folded for each of the perforations to be stacked, and stored in the sheet feeding portion 102.

The floating detection sensor 103 is used to detect floating of a conveying medium. In this embodiment, the floating detection sensor 103 uses an optical sensor. However, it is also possible to use an ultrasound sensor, a sensor of physically detecting contact, or the like, alternatively. In addition, a condition for detection of floating by the floating detection sensor 103 is floating of the conveying medium detected immediately before the convey medium hits the printing head 114. Details of the configuration of the floating detection sensor 103 will be described later.

The first conveyance roller pair 104 is a unit for feeding the sheet to the meander correcting portion 105, the tension detecting portion 106, the printing portion 107, and the postprocessing portion 109 that are disposed in this order along the sheet conveyance path (solid line S), and applying sheet tension between the first conveyance roller pair 104 and the second conveyance roller pair 110. The first conveyance roller pair 104 rotates by driving a motor (not illustrated), and conveys the sheet S with tension by applying predetermined tension to the sheet S.

The meander correcting portion 105 is a unit for correcting a meander in the sheet width direction when conveying the sheet S with tension. The meander correcting portion 105 corrects skew (inclination with respect to an original traveling direction) of the sheet that has passed through the first conveyance roller pair 104. The meander correcting portion 105 includes meander correction rollers **105*a* and a meander detection sensor (for example, ultrasound sensor) (not illustrated) that detects a meander of the sheet S. The meander correction rollers 105*a* make it possible to change their inclination with respect to the sheet S by using motors (not illustrated). The meander correction rollers 105*a* correct the skew of the sheet by pressing, for example, an edge of the sheet on a reference side to a guide member on the basis of measurement taken by the meander correction sensor (detection of position of the sheet S). At this time, the meander correction function is enhanced when the sheet S wraps around the meander correction rollers 105*a***.

The tension detecting portion 106 is a unit for sensing tension when conveying the sheet S with tension between the first conveyance roller pair 104 and the second conveyance roller pair 110. The tension detecting portion 106 includes a conveyance roller **106*a* provided with a strain gauge on its edge. The tension detecting portion 106 is configured to detect tension by detecting a resistance value of the strain gauge output depending on force applied from the sheet S to the conveyance roller 106*a***.

The printing portion 107 is a sheet processor that performs a printing process on the sheet S by causing the printing head 114 to eject ink serving as printing liquid from above onto the sheet S that is being conveyed and forming an image or the like. The conveyance path in the printing portion 107 is formed by a plurality of guide rollers 115 and a plurality of guide members 125 that are arrayed alternately and adjacently in such a manner that the conveyance path has a convex arc shape. In other words, the guide rollers 115 and the guide members 125 constitute a printing portion conveying portion that supports and conveys the sheet S at a position where the guide rollers 115 and the guide members 125 are opposed to the printing head 114. Note that, the printing portion conveying portion does not have to include the guide members 125 as the supporting member, and only the plurality of guide rollers 115 may form the conveyance path having the arc shape.

Figure 6:
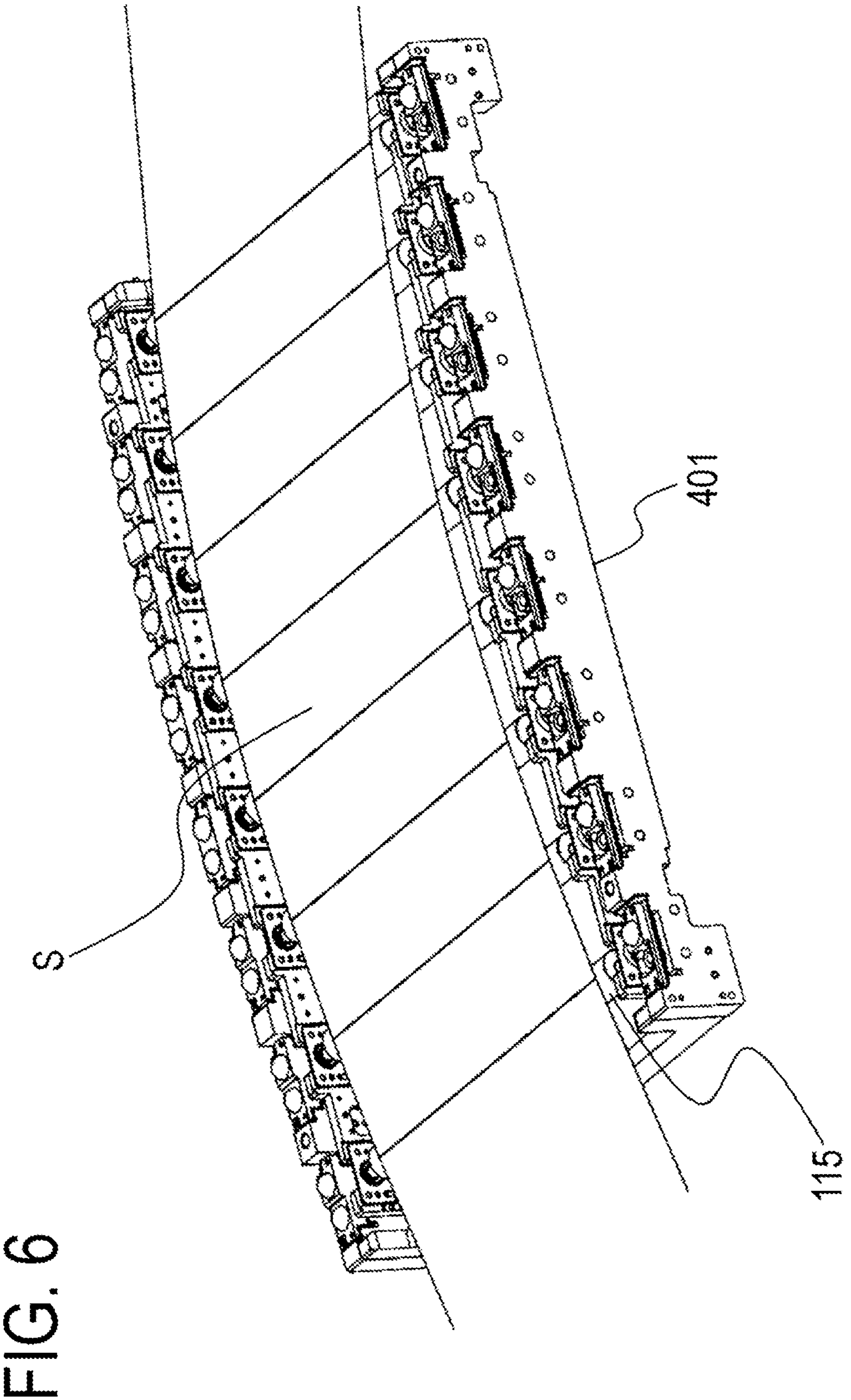
FIG. 6 is a configuration diagram of a printing portion conveying portion according to the first embodiment.

The plurality of guide rollers 115 and the plurality of guide members 125 are supported by a sheet conveyance casing 401 (see FIG. 6 that illustrates the example in which only the guide rollers 115 constitute the printing portion conveying portion without using the guide members 125). The guide rollers 115 are rotatably supported by the sheet conveyance casing 401 in such a manner that the guide rollers 115 are rotatable about rotation axis lines along the width direction of the sheet S, which is perpendicular to the conveyance direction of the sheet S. The guide members 125 are fixed to the sheet conveyance casing 401.

The sheet conveyance casing 401 is configured to be movable by a conveying portion lifting/lowering mechanism (to be described later) to a printing/conveying position and to a non-printing/conveying position. The printing/conveying position is a position where the sheet S is conveyed with tension during printing. The non-printing/conveying position is a position where the conveying portion is separated from the printing heads 114 in comparison with the printing/conveying position. At the printing/conveying position, the guide rollers 115 (and the guide members 125) support the sheet S in such a manner that constant tension is applied to the sheet S, and this makes it possible to ensure clearance between the sheet S and the printing heads 114. On the other hand, at the non-printing/conveying position, the tension applied to the sheet S by the guide rollers 115 (and the guide members 125) are released.

The plurality of printing heads 114 is arrayed in the arc shape along the conveyance direction like the conveyance path. In this embodiment, the plurality of printing heads 114 includes four line printing heads corresponding to inks of respective four colors that are black (Bk), yellow (Y), magenta (M), and cyan (C). Note that, the number of colors and the number of printing heads 114 are not limited to four. As an inkjet printing system, it is possible to adopt a system using a heater element, a system using a piezoelectric element, a system using an electrostatic element, a system using an MEMS element, or the like. The inks of the respective colors are supplied from respective ink tanks (not illustrated) to the printing heads 114 via respective ink tubes.

The plurality of printing heads 114 is held by head holder 116 as a whole. The head holder 116 is configured to be movable by a printing head lifting/lowering mechanism 127 to a printing position and to a non-printing position. The printing position is a position where the printing heads 114 are positioned at a predetermined position at which the printing heads 114 are opposed to the sheet S during printing. The non-printing position is a position where the printing heads 114 are evacuated from the conveyance path in comparison with the printing position. At the printing position, the printing heads 114 are positioned at an angle at which nozzles (ejection ports) on a nozzle plate are perpendicularly opposed to a printed surface of the sheet S (a nozzle surface (ejection port surface) provided with the nozzles is parallel to the printed surface). At the non-printing position, sometimes the head cleaning portion 108 (to be described later) performs various kinds of maintenance on the printing heads 114.

The printing head lifting/lowering mechanism 127 may be a linear motion mechanism, for example. The printing head lifting/lowering mechanism 127 makes it possible to move (lift or lower) the head holder 116 along a rail between the printing position and the non-printing position. This allows the printing heads 114 to change the clearance between the sheet S and the printing heads 114.

The head cleaning portion 108 includes cleaner units (not illustrated) and cap units 117. The cleaner units are configured to clean ink ejection surfaces of the printing heads 114. The cap units 117 are configured to moisturize the ink ejection surfaces of the printing heads 114. The cleaner units are not specifically limited, and a wide variety of cleaner units such as those that wipe by an elastic blade like urethane and suction by band-like fabric, nonwoven fabric, or a rubber-like suction nozzle may be selected depending on features of inks to be used, printing time, and intervals. The cap units 117 reduce contact between ejection nozzles and ambient air and suppress dryness by bringing a tube-shaped rubber member into contact with an outside of an ejection nozzle region of the ink ejection surface. The configuration of the cap units 117 is not limited thereto. It is also possible to create an enclosed space by providing a plate-like member with a rubber rib and bringing the rib into contact. In addition, it is also possible to provide an ambient air communication path and bring pressure on the ejection nozzles to atmospheric pressure as long as it never affects suppression of dryness. In addition, it is also possible to apply a negative pressure on the enclosed space and suction ink from the nozzles. It is also possible to feed liquid to insides of the caps, increase humidity, and enhance its moisturization ability.

The plurality of cleaner units and the plurality of cap units 117 are disposed in an arc shape corresponding to the plurality of printing head heads 114, and are held by a cleaning holder 118 as a whole. The cleaning holder 118 is configured to be movable between a cleaning position and a non-cleaning position. The cleaning position is a position where various kinds of cleaning operations are performed on the printing heads 114. The non-cleaning position is a position where the cleaning holder 118 is separated from the printing heads 114. FIG. 1 illustrates a state of the printing apparatus 101 during printing, and the head cleaning portion 108 is positioned at the non-cleaning position where the head cleaning portion 108 is evacuated from the printing portion 107 (an upstream side in the sheet conveyance direction, that is, a right side of the printing portion 107 in the apparatus as illustrated in FIG. 1.). On the other hand, FIG. 3 illustrates a state of the printing apparatus 101 during the cleaning operation, and the head cleaning portion 108 is positioned immediately below the printing heads 114 in the printing portion 107. To achieve the state illustrated in FIG. 3, the head holder 116 is lifted from the state illustrated in FIG. 1, and the head cleaning portion 108 is slid from the non-cleaning position to the cleaning position (a downstream side in the sheet conveyance direction). Next, the printing heads 114 are moved to a position capable of performing the cleaning operation by lowering the head holder 116. Note that, the configuration of the head cleaning portion 108 is not limited to the configuration in which the head cleaning portion 108 includes both the cleaner units and the cap units 117. The head cleaning portion 108 may include either the cleaner units or the cap units 117. In addition, the sliding direction of the head cleaning portion 108 is not limited to the sheet conveyance direction, but may be the sheet width direction.

The postprocessing portion 109 is a unit for lessening a liquid component included in ink applied to a part of the sheet S on which printing is performed by the printing portion 107 and enhancing fixability of the ink to the sheet S. The postprocessing portion 109 includes a drying portion 121, a fixing portion 122, and a cooling portion 123.

The drying portion 121 heats the part of the sheet S on which printing is performed and dries the applied ink. Inside the drying portion 121, an ink application surface is dried by blowing hot air over at least an upper surface side (ink application surface (printed surface) side) of the part of the sheet S passing through the drying portion 121. Note that, the drying method may be a method of irradiating a sheet surface with electromagnetic waves (such as ultraviolet rays or infrared rays), a method of conducting heat through contact of a heating element, or a combination thereof in addition to or instead of the method of blowing hot air.

The fixing portion 122 enhances the fixability of the ink to the sheet S by adding predetermined heat to the part of the sheet S dried by the drying portion 121 and softening/melting the ink. Inside the fixing portion 122, the ink application surface is fixed by blowing hot air over at least the upper surface side of the part of the sheet S passing through the fixing portion 122. The hot air has a heat that is greater than or approximately equal to a heat produced by the drying portion 121. Note that, the fixing method may be a method of irradiating a sheet surface with electromagnetic waves (such as ultraviolet rays or infrared rays), a method of sandwiching the sheet between heating elements and applying thermal pressure on the sheet, or a combination thereof in addition to or instead of the method of blowing hot air.

The cooling portion 123 cools the part of the sheet S to which the ink is fixed by the fixing portion 122, solidifies the softened ink, and suppresses an amount of change in sheet temperature in a downstream process in the printing apparatus 101. Inside the cooling portion 123, the ink application surface is cooled by blowing air over at least the upper surface side of the part of the sheet S passing through the cooling portion 123. The air has a temperature that is lower than the temperature of the sheet. Note that, the cooling method is not limited to the method of blowing air, but may be a method of conducting heat through contact of a heat release member, or a combination thereof.

The second conveyance roller pair 110 is a unit for conveying the sheet and adjusting tension of the sheet S while applying tension with the first conveyance roller pair 104. The second conveyance roller pair 110 rotates by driving a motor (not illustrated). A tension control portion 124 adjusts the tension of the sheet S by controlling speed of the second conveyance roller pair 110 depending on a tension value detected by the tension detecting portion 106. Note that, as an additional component for adjusting the tension of the sheet S, a component that uses a clutch (not illustrated) to adjust the tension of the sheet S may be added. The clutch makes it possible to control torque by using the tension detecting portion 106. In this case, the apparatus adopts two types of tension control methods including a speed control method and a torque control method, and it is possible to simultaneously use both methods or switch between the two tension control methods depending on its purpose. The speed control method is a method of controlling roller speed of the second conveyance roller pair 110. The torque control method is a method of controlling a torque value transferred from the clutch.

The sheet collecting portion 111 is a unit (winding portion) for winding the portion of the sheet S that has passed through the printing portion 107 and that has been subjected to the printing process, on a winding core at a downstream side of the sheet conveyance path from the printing portion 107. Note that, the number of retrievable rolls is not limited to one. The sheet collecting portion 111 may include two or three or more winding cores, and may be configured to collect the sheet by selecting one of the cores. Note that, depending on contents of a process after printing, it is also possible to adopt a configuration that cuts the continuous sheet by using a cutter and loads the cut sheet therein instead of the configuration that winds the sheet on the winding core.

The control portion 112 is a unit for controlling the plurality of components in the whole printing apparatus 101. The control portion 112 includes a CPU, a storage device, a controller including various kinds of control portions, an external interface, and an operation portion 119 through which a user performs input and output. An operation of the printing apparatus 101 is controlled on the basis of an instruction from the controller or a host device 120 such as a host computer connected to the controller via the external interface.

Figure 4:
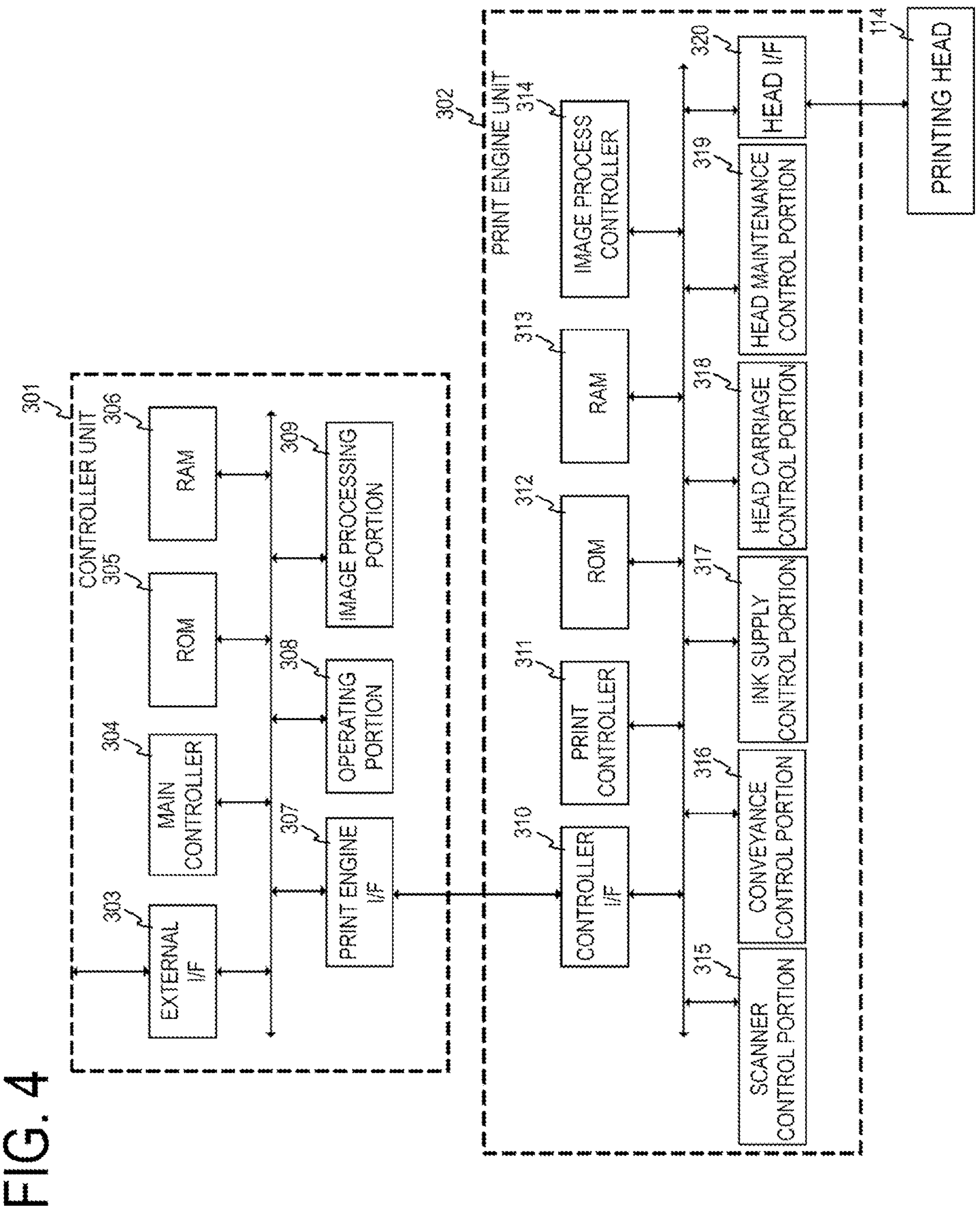
FIG. 4 is a block diagram of a control configuration of the printing apparatus according to the first embodiment.

FIG. 4 is a block diagram illustrating a control configuration of the printing apparatus 101 that uses the inkjet printing system according to the embodiment of the present invention. The control configuration mainly includes a controller unit 301 that exercises control over the whole printing apparatus 101, a print engine unit 302 that exercises control over the printing portion 107, and the printing heads 114. A print controller 311 controls various kinds of mechanisms of the print engine unit 302 under instructions from a main controller 304 of the controller unit 301.

In the controller unit 301, the main controller 304 including a CPU controls the whole printing apparatus 101 in accordance with various parameters and programs stored in a ROM 305, while treating a RAM 306 as a work area. For example, when a print job is input from a host device that is an external device via an external I/F 303, an image processing portion 309 performs a predetermined image process on received image data under instructions from the main controller 304. Next, the main controller 304 transmits the image data subjected to the image process to the print engine unit 302 via a print engine I/F 307.

Note that, as means by which the printing apparatus 101 acquires the image data, the printing apparatus 101 may acquire the image data from another host device through wireless or wired communication. Alternatively, the image data may be obtained by an image reader device that serves as an external device connected to the printing apparatus 101, or by an image reader device that is connected to an inside of the apparatus. Alternatively, the image data may be acquired from an external storage device (such as a USB memory) connected to the printing apparatus 101. The communication means for obtaining the image data, the connected external device, and the like are not specifically limited.

An operation portion 308 is a portion that allows a user to perform input/output to/from the printing apparatus 101. Via the operation portion 308, the user makes it possible to instruct the printing apparatus 101 to perform an operation such as copying or scanning, set a printing mode, and recognize information about the printing apparatus 101.

In the print engine unit 302, the print controller 311 including a CPU controls various kinds of mechanisms of the printing portion 107 in accordance with various parameters and programs stored in a ROM 312, while treating a RAM 313 as a work area. When various kinds of commands and image data are received via a controller I/F 310, or when an image reader portion (not illustrated) acquires the image data under the control of the scanner control portion 315, the print controller 311 temporarily stores the image data in the RAM 313. The print controller 311 causes an image process controller 314 to convert the stored image data into printing data in such a manner that that the printing heads 114 can use the printing data for a printing operation. When the printing data is generated, the print controller 311 causes the printing heads 114 to perform the printing operation based on the printing data via a head I/F 320. At this time, the sheet S is conveyed when the print controller 311 drives the conveying portion (various kinds of units associated with conveyance of the sheet S as illustrated in FIG. 1) of the printing apparatus 101 via the conveyance control portion 316. The printing heads 114 perform the printing operation in tandem with the conveyance operation of the sheet S under an instruction from the print controller 311, thereby performing the printing process.

A head carriage control portion 318 changes orientations and positions of the printing heads 114 depending on an operating state of the printing apparatus 101 such as a maintenance state or a printing state. An ink supply control portion 317 performs control in such a manner that pressure of ink to be supplied to the printing heads 114 is within a suitable range. A head maintenance control portion 319 controls operations of the cap units and a wiping unit in a maintenance unit when a maintenance operation is performed on the printing heads 114.

In addition, when controlling the various kinds of mechanisms illustrated in FIG. 4, the print controller 311 may control the mechanisms included in the printing portion 107. Alternatively, the print controller 311 only controls the whole apparatus while each of the image process controller

314, the scanner control portion 315, the conveyance control portion 316, the ink supply control portion 317, the head carriage control portion 318, and the head maintenance control portion 319 includes a CPU, a ROM, a RAM, and the like.

Figure 5A:
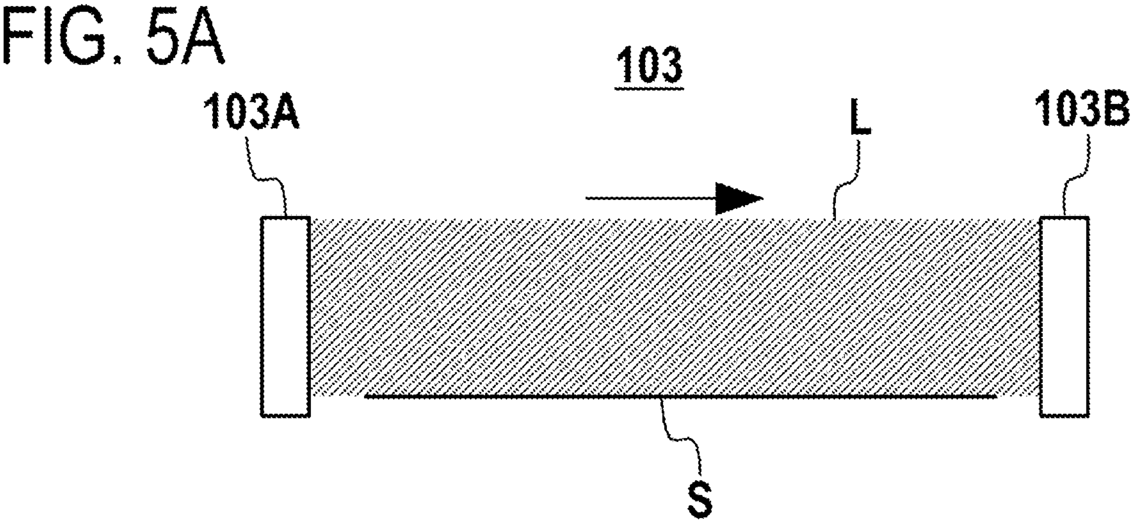
FIGS. 5A and 5B are explanatory diagrams of a floating detection sensor according to the first embodiment.
Figure 5B:
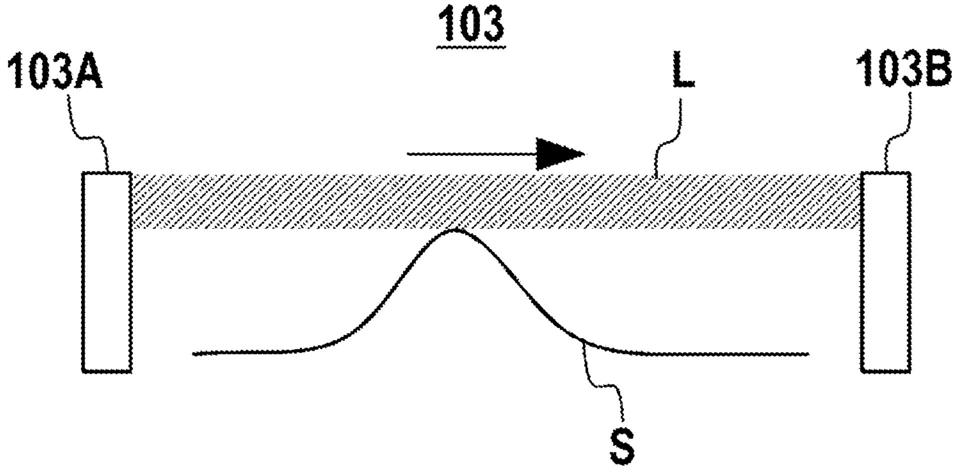

FIGS. 5A and 5B are schematic diagrams for describing a configuration of the floating detection sensor 103 serving as a floating detecting portion. The floating detection sensor 103 includes a light emitting portion 103A and a light receiving portion 103B. The light emitting portion 103A and the light receiving portion 103B are disposed above the printed surface of the sheet S in such a manner that the light emitting portion 103A and the light receiving portion 103B are opposed to each other along the conveyance direction of the sheet S, and they detect whether or not the sheet S is floating on the basis of an amount of light received by the light receiving portion 103B. In other words, the light emitting portion 103A emits detection light L in such a manner that the detection light L travels toward the light receiving portion 103B along the conveyance direction of the sheet S in a region above the printing target surface of the sheet S. As illustrated in FIG. 5A, the floating detection sensor 103 is configured in such a manner that an amount of light received by the light receiving portion 103B is about 100% and the floating detection sensor 103 outputs, for example, output voltage of 5 V as an output value in the case where the sheet S is not floating. On the other hand, in the case where the sheet S is floating as illustrated in FIG. 5B, a portion of the detection light L is blocked by the floating of the sheet S, and the amount of light received by the light receiving portion 103B is reduced to about 20%, for example. At this time, the floating detection sensor 103 is configured to output, for example, output voltage of 1 V. When detecting the floating, for example, a threshold is set to 4 V, and it is determined that the sheet S is floating in the case where the output voltage is 4 V or less.

Emergency Evacuation Configuration when Floating of Printing Material is Detected The printing apparatus 101 according to the present embodiment conveys the sheet S when the print controller 311 drives the conveying portion of the printing apparatus 101 via the conveyance control portion 316. Next, the guide rollers 115 are evacuated from the printing/conveying position to the non-printing/conveying position instantly in the case where the floating detection sensor 103 detects the floating of the sheet S during conveying the sheet S. This configuration prevents failure caused when the sheet S bumps into the printing head 114.

In other words, an operation of evacuating the guide rollers 115 from the printing/conveying position to the non-printing/conveying position is a separation operation of widening an opposing interval between the guide rollers 115 and the printing heads 114. By performing the separation operation, it is possible to achieve the state where the conveyance path of the sheet S is separated from the printing heads 114. This makes it possible to avoid contact between the printing heads 114 and the floated sheet S.

Note that, the separation operation for avoiding contact between the printing heads 114 and the sheet S may be an operation of evacuating not only the guide rollers 115 but also the printing heads 114. Alternatively, it is also possible to avoid contact between the printing heads 114 and the sheet S by evacuating the printing heads 114 without evacuating the guide rollers 115. However, the operation of evacuating the guide rollers 115 is also expected to weaken the tension of the floated sheet S and cancel the floating. Therefore, sometimes it may be possible to enhance an effect of avoiding contact between the printing heads 114 and the sheet S more than the case of only evacuating the printing heads 114 alone.

A movement mechanism according to the present embodiment will be described with reference to FIGS. 6 to 10. The movement mechanism is configured to move at least the printing heads or the printing portion conveying portion and change an opposing interval between the printing heads and the printing portion conveying portion. Note that, a specific configuration of the movement mechanism to be described below is a mere example. It is also possible to appropriately adopt any conventionally known movement mechanism that is not described here, as long as the movement mechanism achieves the emergency evacuation operation to be described below.

Figure 7:
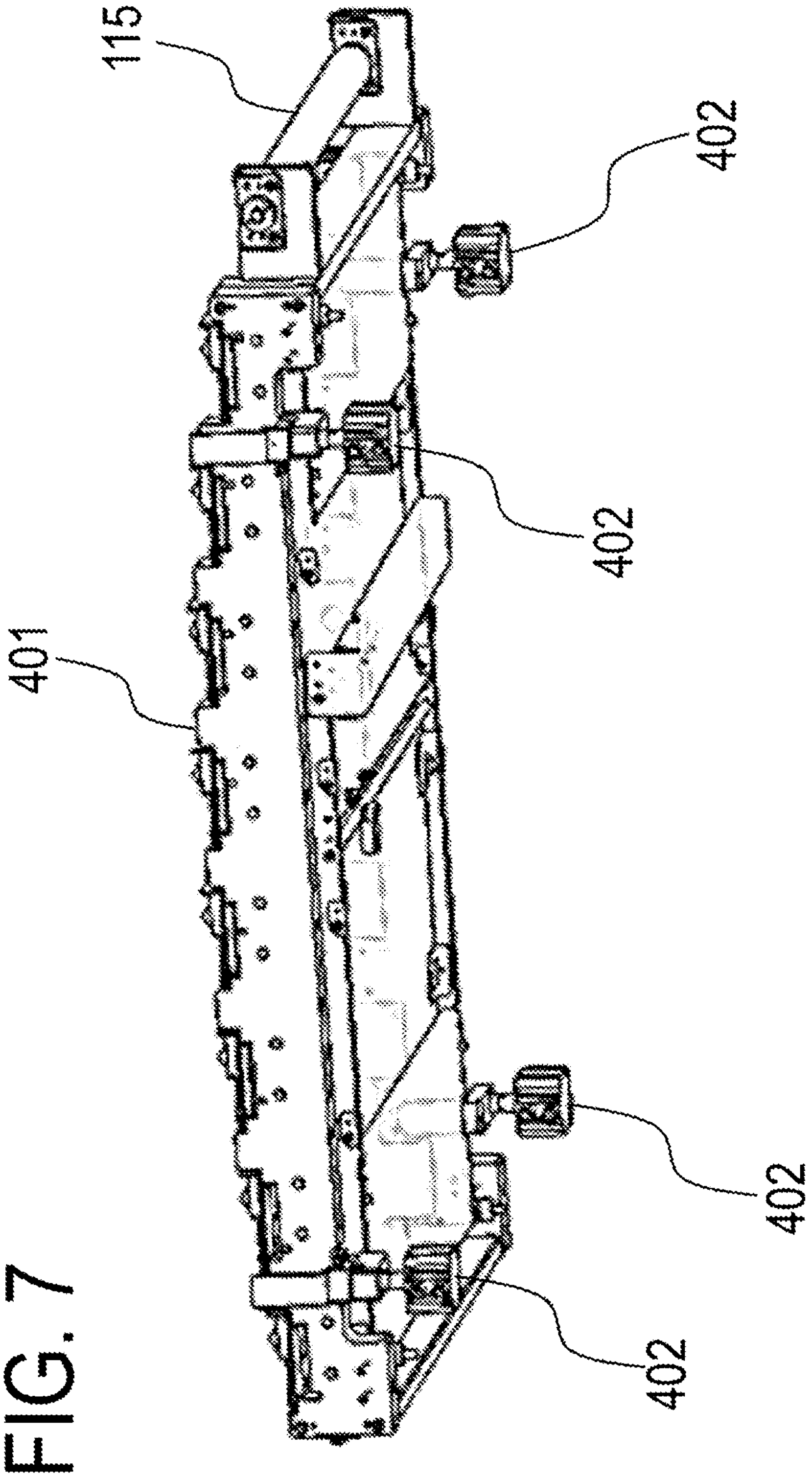
FIG. 7 is a configuration diagram of the printing portion conveying portion according to the first embodiment.
Figure 8A:
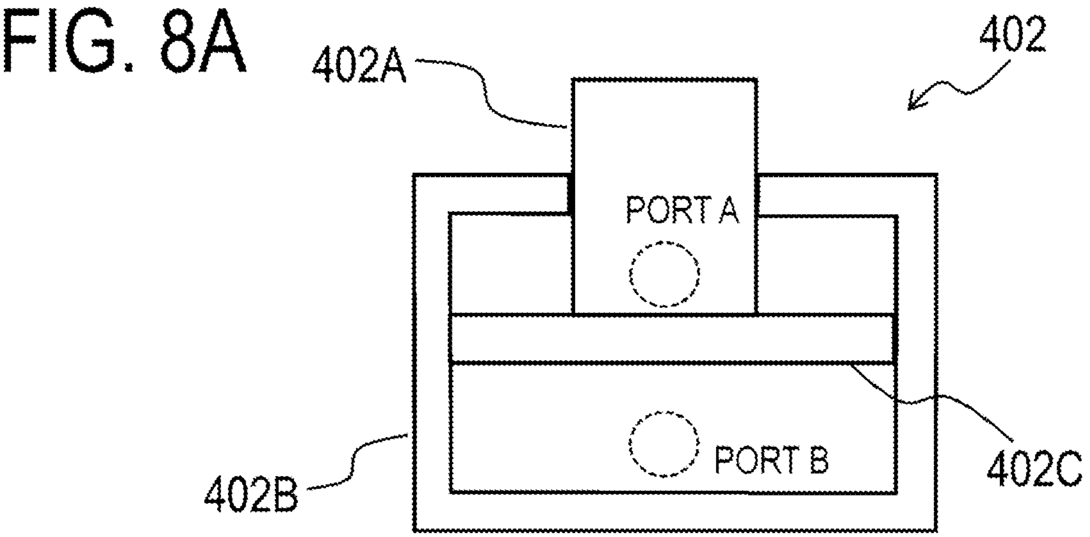
FIGS. 8A to 8C are explanatory diagrams of a control configuration of the printing portion conveying portion according to the first embodiment.
Figure 8B:
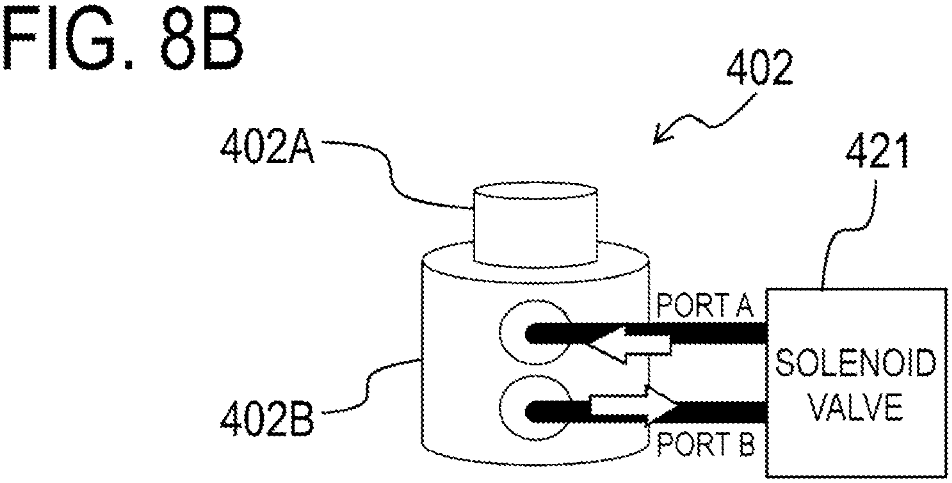
Figure 8C:
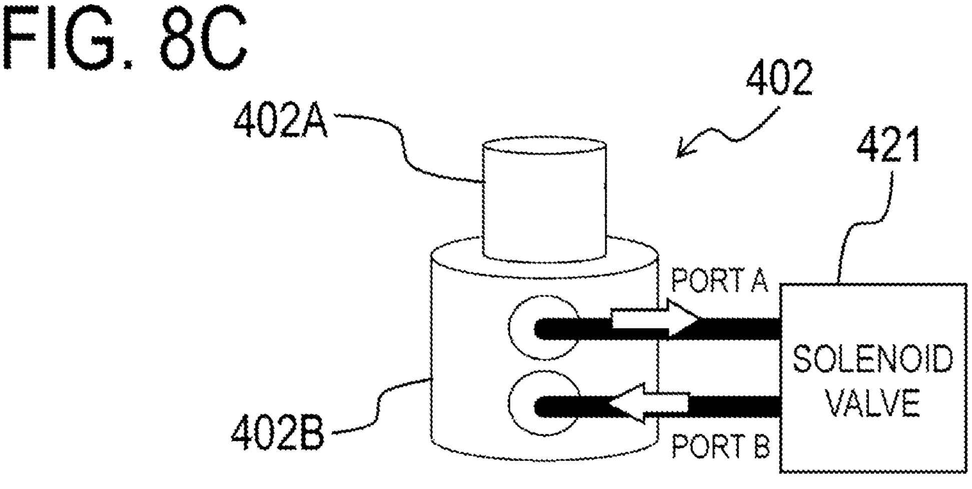
Figure 9:
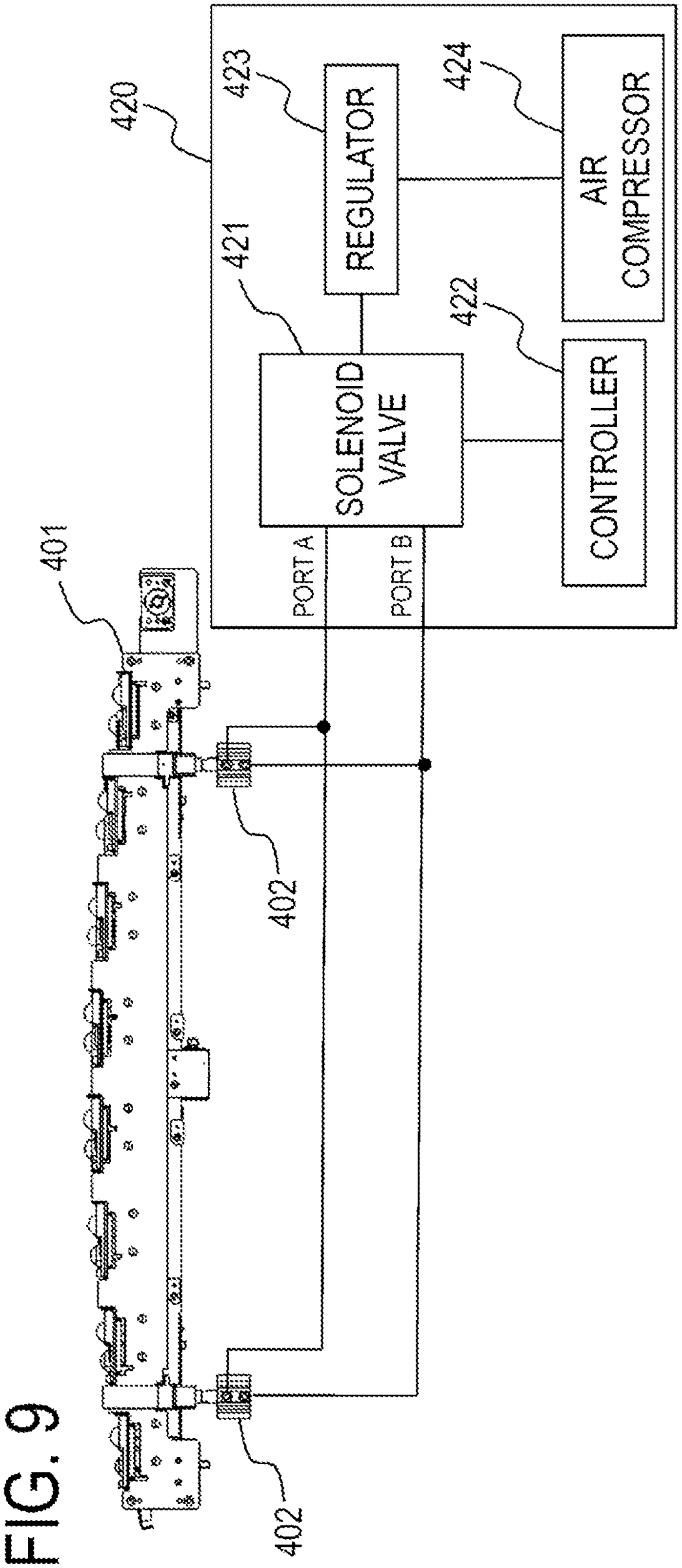
FIG. 9 is an explanatory diagram of a configuration of a lifting/lowering member according to the first embodiment.

FIG. 6 is a diagram for describing a configuration of the printing portion conveying portion of the printing apparatus 101 according to the present embodiment, and is a perspective view of the sheet conveyance casing 401 when viewed from above (the printing target surface side of the sheet S). FIG. 7 is a diagram for describing the configuration of the printing portion conveying portion of the printing apparatus 101 according to the present embodiment, and is a perspective view of the sheet conveyance casing 401 when viewed from below. FIGS. 8A to 8C are schematic diagrams for describing a control configuration of the printing portion conveying portion of the printing apparatus 101 according to the present embodiment. FIG. 9 is an explanatory diagram of a configuration of a lifting/lowering member 402 according to the first embodiment. FIG. 8A is a schematic cross-sectional view of the lifting/lowering member 402. FIG. 8B is an explanatory diagram when the lifting/lowering member 402 is controlled to be lowered. FIG. 8C is an explanatory diagram when the lifting/lowering member 402 is controlled to be lifted.

As illustrated in FIG. 7, the lifting/lowering members 402 are substantially disposed on respective four corners of a lower surface of the sheet conveyance casing 401 that rotatably supports the guide roller 115. The sheet conveyance casing 401 is supported by the lifting/lowering members 402, and is movable upward and downward between the printing/conveying position and the non-printing/conveying position by expansion and contraction operations of the lifting/lowering members 402. In the present embodiment, each of the lifting/lowering members 402 includes an air cylinder.

As illustrated in FIG. 8A, the lifting/lowering member 402 substantially includes a rod portion 402A, a cylinder portion 402B, a head portion 402C, and the like. The rod portion 402A is coupled to the sheet conveyance casing 401, and strokes the cylinder portion 402B (expands or contracts) by a balance between an air pressure on a head side and an air pressure on a rod side inside the cylinder portion 402B. The sheet conveyance casing 401 is lifted and lowered by the stroke given by the rod portion 402A to the cylinder portion 402B.

As illustrated in FIG. 9, the lifting/lowering member control portion 420 controls the lifting/lowering members 402 and includes a solenoid valve 421, a controller 422, a regulator 423, an air compressor 424, and the like. The solenoid valve 421 includes a port A and a port B. The port A is connected to rod sides inside the cylinder portions 402B, and the port B is connected to head sides inside the cylinder portions 402B. The controller 422 performs control in such a manner that a port through which the solenoid valve 421 supplies/exhausts air to/from the cylinder portions 402B is switched between the two ports A and B, and this causes the rod portion 402A to stroke the cylinder portion 402B. The regulator 423 switches intensity of the air pressure applied from the air compressor 424 to the solenoid valve 421.

As illustrated in FIG. 8B, air is supplied to the rod side of the cylinder portion 402B via the port A and air is exhausted from the head side of the cylinder portion 402B via the port B, when the guide rollers 115 are evacuated from the printing/conveying position to the non-printing/conveying position. This contracts the rod portion 402A coupled to the sheet conveyance casing 401 toward the cylinder portion 402B, and lowers the sheet conveyance casing 401. On the other hand, when the sheet is normally conveyed, air is exhausted from the rod side of the cylinder portion 402B via the port A and air is supplied to the head side of the cylinder portion 402B via the port B as illustrated in FIG. 8C. This expands the rod portion 402A toward the cylinder portion 402B, and lifts the sheet conveyance casing 401.

FIGS. 10 and 11A to 11D are explanatory diagrams illustrating another configuration example of the configuration that moves the printing heads. As described above, the printing head lifting/lowering mechanism in the printing apparatus 101 according to the present embodiment is configured to lift and lower the plurality of printing heads 114 as a whole by lifting/lowering the head holder 116. However, the configuration that moves the printing heads 114 is not limited thereto. In other words, according to a modification illustrated in FIGS. 10 and 11A to 11D, a printing head lifting/lowering mechanism may be configured to lift and lower the plurality of printing heads 114 independently and separately.

Figure 10:
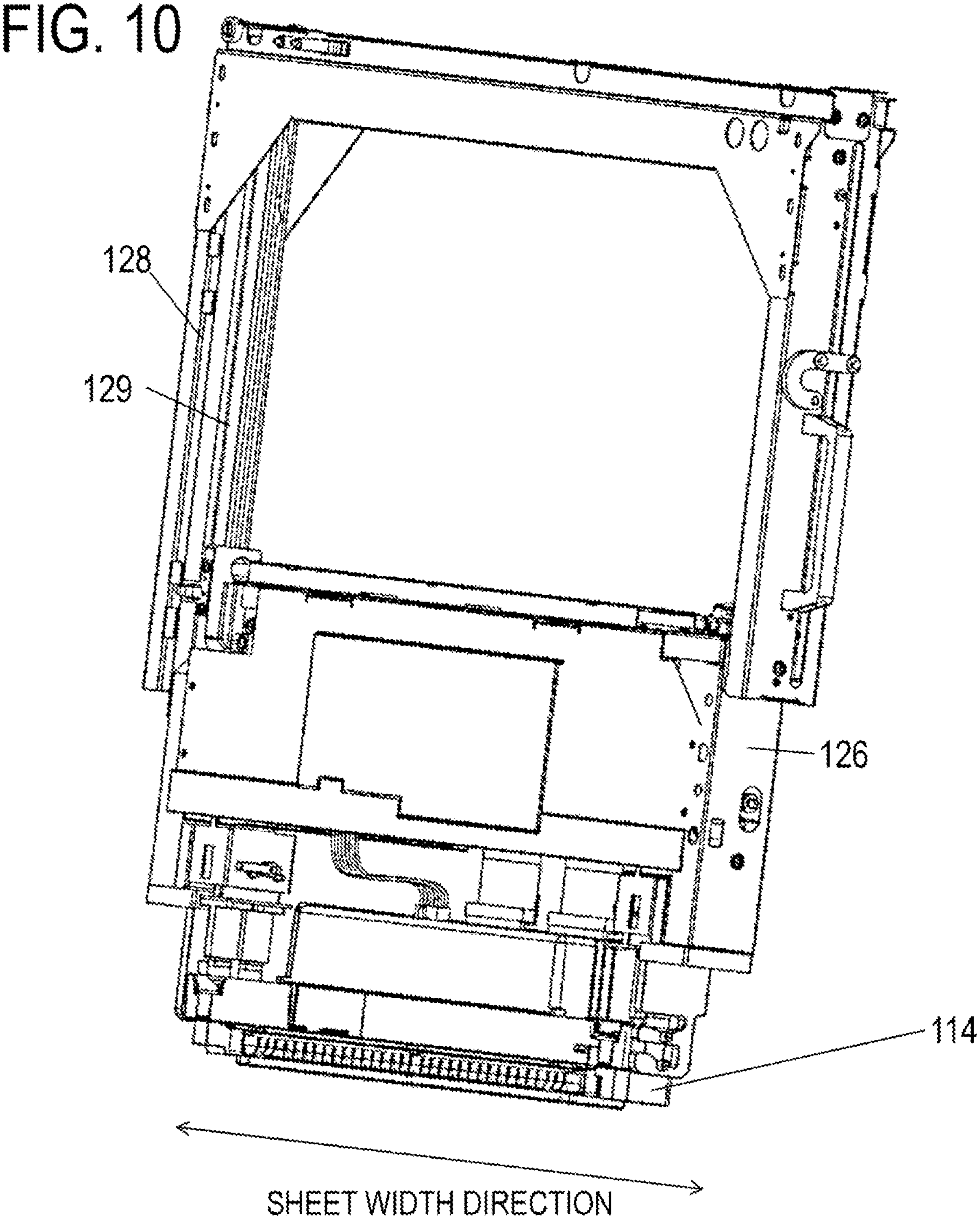
FIG. 10 is an explanatory diagram of another configuration example of a printing head lifting/lowering mechanism according to the first embodiment.

FIG. 10 is a perspective view of the printing head lifting/lowering mechanism according to the modification. According to the modification, the plurality of printing heads 114 is configured to be separately held by head holders 126 serving as support/movement portions, and to be moved upward and downward by movement of the head holders 126. Each of the head holders 126 includes a drive mechanism (not illustrated) therein, and moves upward and downward along a lifting/lowering rail 129 attached to an inside of a printing head lifting/lowering frame 128.

Figure 11A:
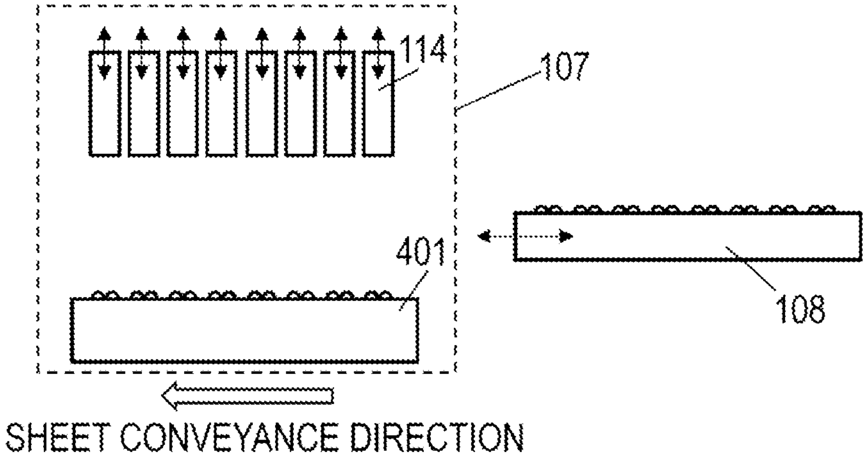
FIGS. 11A to 11D are explanatory diagrams of the other configuration example of the printing head lifting/lowering mechanism according to the first embodiment.

FIGS. 11A to 11D are schematic explanatory diagrams illustrating an operation example of the printing head lifting/lowering mechanism according to the modification. FIG. 11A is a schematic diagram illustrating a state where the printing heads 114 are at an evacuation position serving as a non-printing position and a head cleaning portion 108 is at a non-maintenance position. The evacuation position is a position where the printing heads 114 are evacuated to an upper side above the sheet conveyance casing 401. The non-maintenance position is a position where the head cleaning portion 108 is evacuated from the printing heads 114.

Figure 11B:
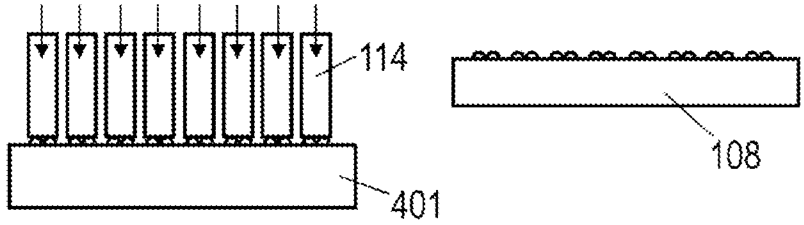

FIG. 11B is a schematic diagram illustrating a state where the printing heads 114 are at a printing position. The printing position is a position where the printing heads 114 print an image on the sheet S. The above-described printing head lifting/lowering mechanism substantially moves the printing heads 114 in a perpendicular direction from the upper evacuation position toward a bottom, in the case where the printing heads 114 move from the evacuation position to the printing position. The movement of the printing heads 114 is completed when positioned portions of the printing heads 114 are lowered to the printing position where the positioning target portions abut on a positioning member attached to the sheet conveyance casing 401 and the positioned portions are positioned.

Figure 11C:
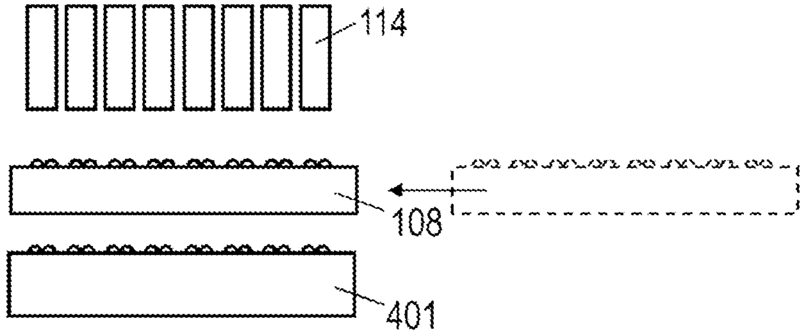

FIG. 11C is a schematic diagram illustrating a state where the printing heads 114 are at the evacuation position and the head cleaning portion 108 is moved to a maintenance position. The head cleaning portion 108 performs the maintenance operation on the printing heads 114, in the case of capping the printing heads 114 or in the case where a nozzle of a printing head 114 is blocked and a fault occurs in ink ejection after the printing operation. In the case of performing the maintenance operation, the printing heads 114 and the head cleaning portion 108 first move to the respective evacuation positions as illustrated in FIG. 11A. Subsequently, the head cleaning portion 108 moves almost horizontally in the sheet conveyance direction, and moves to the maintenance position below the printing heads 114.

Figure 11D:
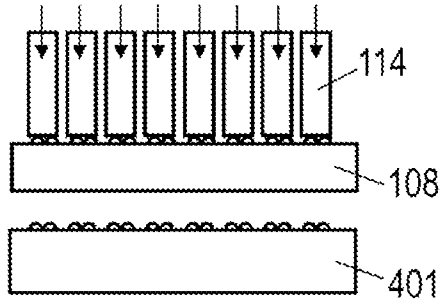

FIG. 11D is a schematic diagram illustrating a state where the printing heads 114 are moved to the maintenance position. The maintenance position is a position where the head cleaning portion 108 performs the maintenance operation on the printing heads 114. The printing heads 114 substantially move in the perpendicular direction from the state illustrated in FIG. 11C toward the bottom, and the positioning target portions of the printing heads 114 are lowered to the maintenance position where the positioned portions abut on a printing head positioning portion attached to the head cleaning portion 108 and the positioned portions are positioned. The head cleaning portion 108 performs various kinds of maintenance operations on the printing heads 114 in this state.

Figure 12:
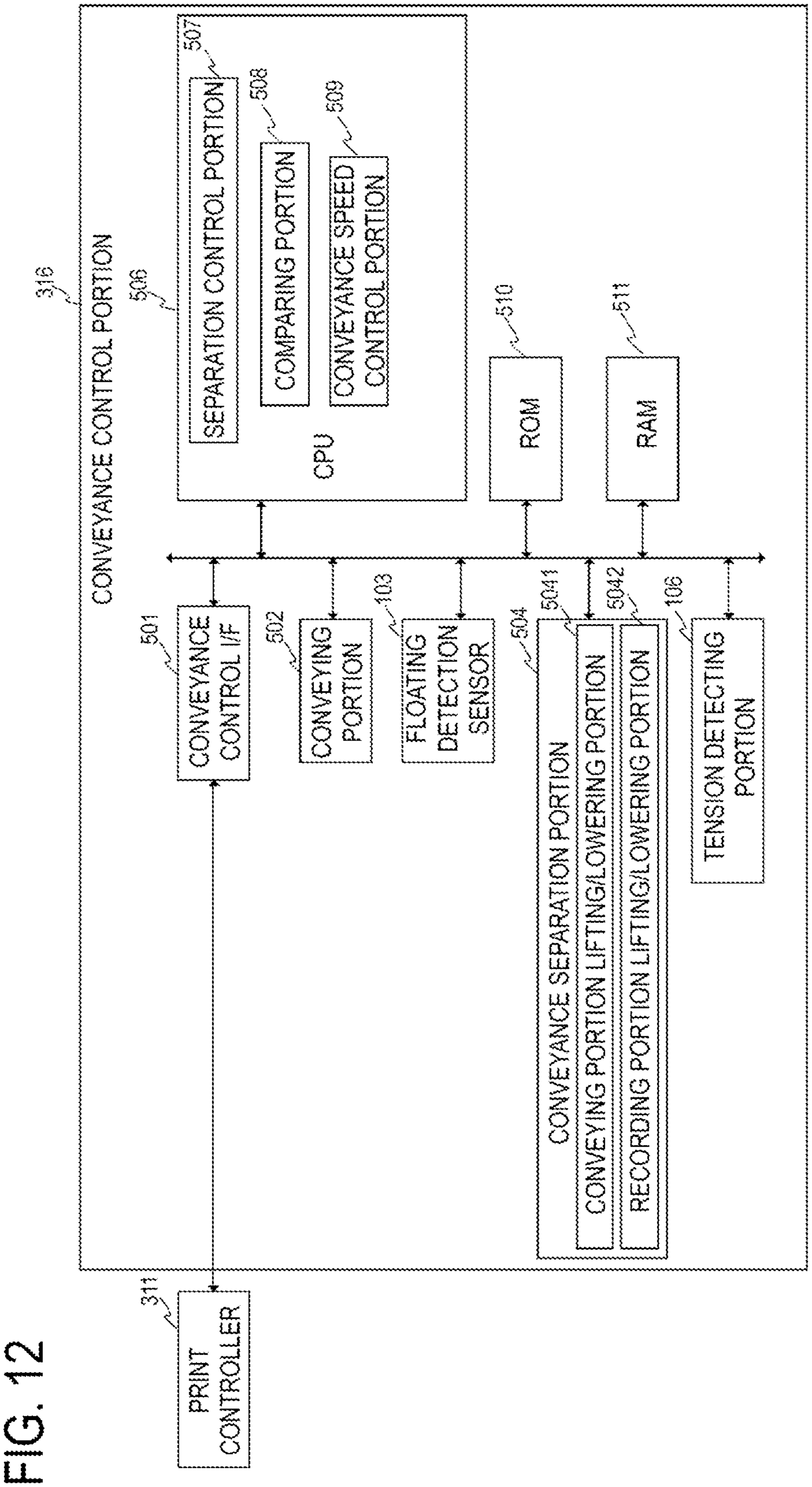
FIG. 12 is a block diagram of a separation control configuration according to the first embodiment.

FIG. 12 is a block diagram of a separation control configuration. The conveyance control portion 316 controls conveyance via a conveyance control I/F 501 on an order from the print controller 311. A conveyance speed control portion 509 of a CPU 506 controls conveyance speed of a conveying portion 502. When controlling the conveyance speed, a goal tension value is set for each printing medium stored in a ROM 510, and the control is performed to reach the tension values. The tension detecting portion 106 detects tension and stores a detected tension value in a RAM 511. A comparing portion 508 compares the goal tension value with the detected tension value stored in the RAM 511. In the case where the detected tension value is lower than the goal tension value, conveyance speed of the sheet collecting portion 111 is increased in such a manner that this raises the tension. On the other hand, in the case where the detected tension value is higher than the goal tension value, conveyance speed of the sheet collecting portion 111 is slowed down in such a manner that this lowers the tension.

A separation control portion 507 performs separation control on a conveyance separation portion 504 in the case where the floating detection sensor 103 detects floating of the convey medium during conveyance control as described above.

The conveyance separation portion 504 includes a conveying portion lifting/lowering portion 5041 and a printing portion lifting/lowering portion 5042. The conveying portion lifting/lowering portion 5041 controls the lifting/lowering member control portion 420 illustrated in FIG. 9. In other words, the controller 422 is controlled in such a manner that a port through which the solenoid valve 421 supplies/exhausts air is switched between the port A and the port B, and the regulator 423 is controlled in such a manner that the regulator 423 switches intensity of the air pressure applied from the air compressor 424 to the solenoid valve 421. The printing portion lifting/lowering portion 5042 controls a motor that is a power source of the printing head lifting/lowering mechanism (linear motion mechanism) 127 configured to lift and lower the head holder 116.

Figure 13:
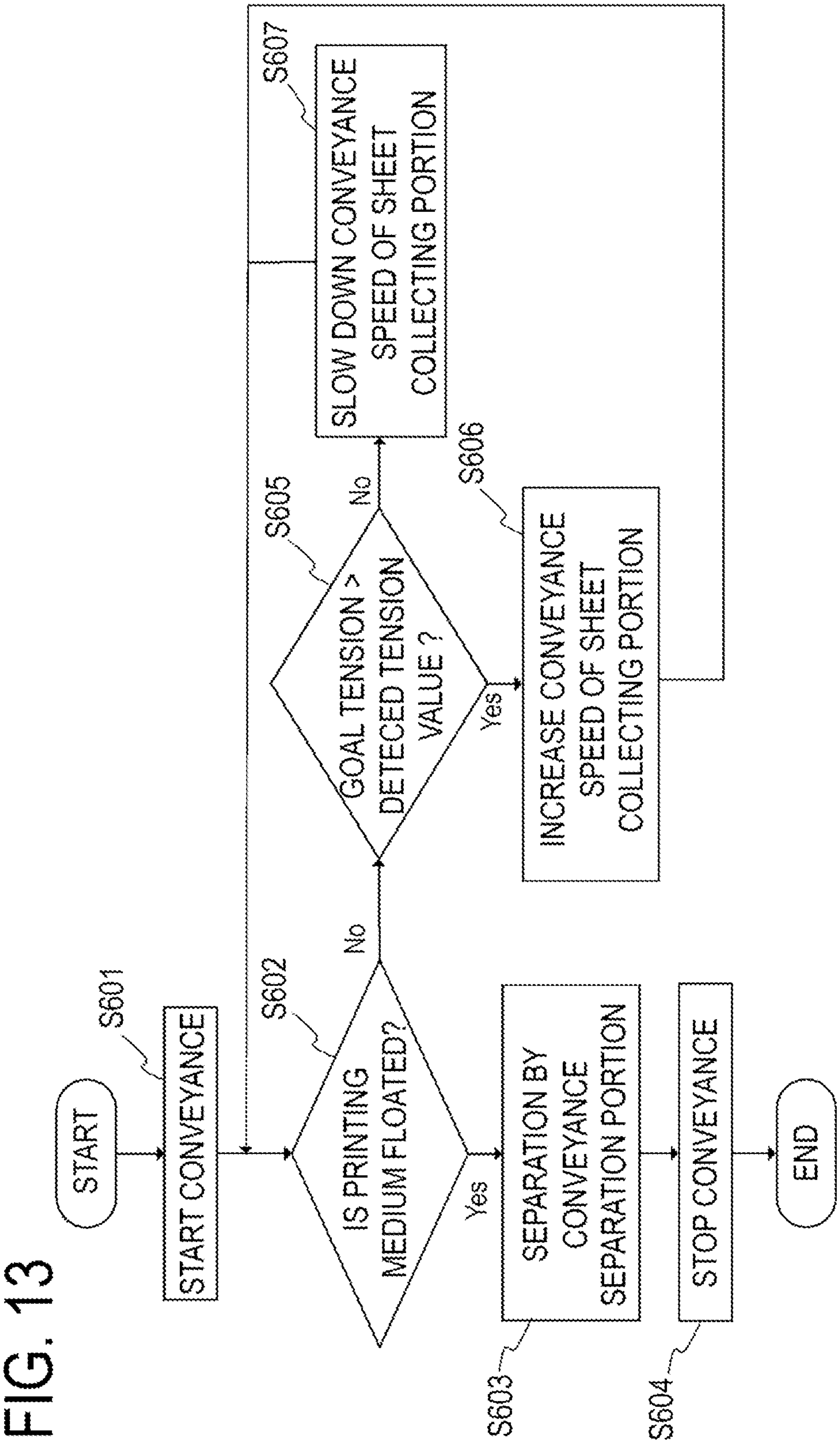
FIG. 13 is a flowchart of separation control according to the first embodiment.

FIG. 13 is a flowchart of separation control according to the first embodiment. First, in Step S601, the conveyance speed control portion 509 of the CPU 506 serving as the control portion starts driving of the sheet feeding portion 102 and the sheet collecting portion 111 and starts convey of the sheet S on an order from the print controller 311. The sheet feeding portion 102 conveys the sheet S at a constant speed depending on a conveyance speed set by the user. Meanwhile, the sheet collecting portion 111 controls the conveyance speed to reach the goal tension value.

In Step S602, a contact avoidance operation of avoiding contact between the sheet S and the printing heads 114 is performed in the case where the floating detection sensor 103 detects floating of the sheet S. That is, the process proceeds to Step S603, and the separation control portion 507 of the CPU 506 performs the separation operation of the conveyance separation portion 504. In addition, the process proceeds to Step S604, and the conveyance speed control portion 509 of the CPU 506 performs a conveyance stop operation of stopping the conveying portion from conveying the sheet S.

Here, the separation operation of the conveyance separation portion 504 is an operation of evacuating the guide rollers 115 in the present embodiment. Note that, as described above, the separation operation may be an operation of evacuating not only the guide rollers 115 but also the printing heads 114. Alternatively, the separation operation may be an operation of evacuating the printing heads 114 without evacuating the guide rollers 115.

In addition, a timing of the conveyance stop operation is controlled in such a manner that the timing comes after the separation operation. Therefore, for example, in the case where the conveyance stop operation is performed before the separation operation, there is a possibility that the sheet S may be floated immediately below the printing heads 114 due to vibration caused by stopping the conveyance, and the sheet S may come into contact with a printing head 114. Accordingly, in view of inertia of the motor, variation in control delay, and the like, the timing of the conveyance stop operation is controlled in such a manner that the timing certainly comes after the separation operation.

In the case where the sheet S is not floating in Step S602, the comparing portion 508 of the CPU 506 compares a goal tension with a detected tension value in Step S605. The process proceeds to Step S606 in the case where the detected tension value is lower than the goal tension. In Step S606, the conveyance speed control portion 509 of the CPU 506 increases conveyance speed (winding speed) of the sheet collecting portion 111. On the other hand, in the case where the detected tension value is higher than the goal tension, the process proceeds to Step S607 and the conveyance speed control portion 509 of the CPU 506 slows down the conveyance speed of the sheet collecting portion 111.

The above-described control makes it possible to certainly avoid the contact between the printing heads 114 and the sheet S during the emergency evacuation operation performed when the floating of the sheet S is detected.

Second Embodiment

In a second embodiment of the present invention, the sheet feeding portion 102 stops feeding the sheet S simultaneously with the separation operation of the conveyance separation portion 504 in the case where the sheet S is floating during conveyance. Next, the sheet collecting portion 111 stops winding the sheet S. This makes it possible to prevent failure caused when the sheet S bumps into the printing head 114 due to deflection of the sheet S during the separation operation. In addition, during the conveyance stop operation, it is possible to prevent deflection of the sheet S due to the conveyance stop operation by performing control in such a manner that the sheet collecting portion 111 stops winding the sheet after the sheet feeding portion 102 stops feeding the sheet.

Note that, the apparatus configuration of the printing apparatus according to the second embodiment is similar to the apparatus configuration of the printing apparatus according to the first embodiment. In other words, matters which will not be particularly described here in connection with the second embodiment are similar to those of the first embodiment.

Figure 14:
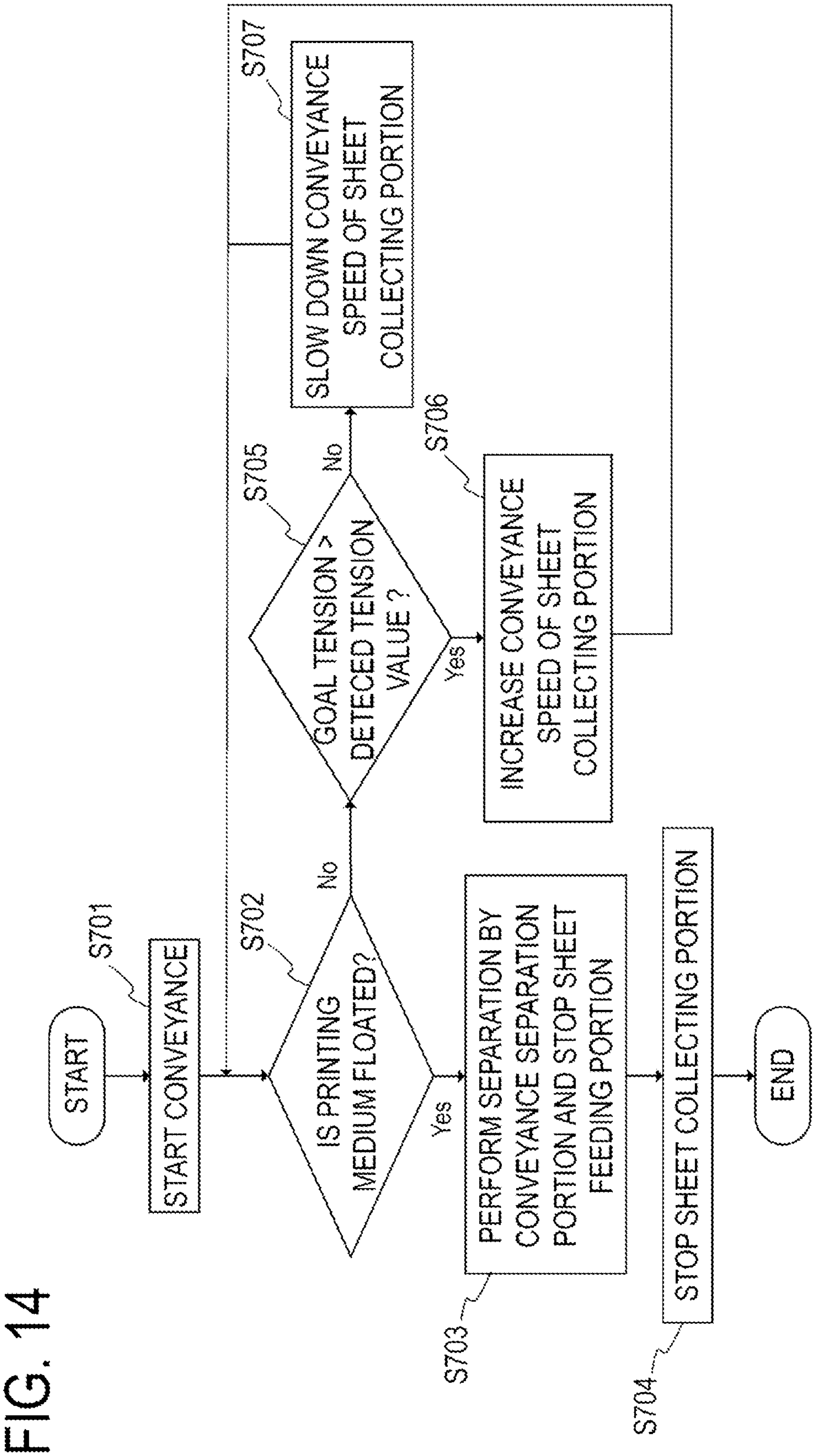
FIG. 14 is a flowchart of separation control according to a second embodiment.

FIG. 14 illustrates a flowchart of separation control according to the second embodiment of the present invention. First, in Step S701, the conveyance speed control portion 509 of the CPU 506 serving as the control portion starts driving of the sheet feeding portion 102 and the sheet collecting portion 111 and starts conveyance of the sheet S on an order from the print controller 311. The sheet feeding portion 102 conveys the sheet S at a constant speed depending on a conveyance speed set by the user. Meanwhile, the sheet collecting portion 111 controls the conveyance speed to reach the goal tension value.

In Step S702, a contact avoidance operation of avoiding contact between the sheet S and the printing heads 114 is performed in the case where the floating detection sensor 103 detects floating of the sheet S. That is, the process proceeds to Step S703, the separation control portion 507 of the CPU 506 performs the separation operation of the conveyance separation portion 504, and the conveyance speed control portion 509 of the CPU 506 stops the sheet feeding portion 102 at the same time. Next, the process proceeds to Step S704, and the conveyance speed control portion 509 of the CPU 506 stops the sheet collecting portion.

Note that, there is a possibility that the sheet feeding portion 102 and the sheet collecting portion 111 are not stopped at a same time due to inertia of the motor, variation in control delay, and the like, in the case of trying to stop the sheet feeding portion 102 and the sheet collecting portion 111 at the same time. Therefore, there is a possibility that the sheet S deflects and comes into contact with a printing head 114 if the sheet feeding portion 102 stops after the sheet collecting portion 111 stops. Accordingly, control is performed in such a manner that the sheet collecting portion 111 stops certainly after the sheet feeding portion 102 stops. This makes it possible to certainly suppress the above-described deflection of the sheet S and contact between the sheet S and the printing heads 114 caused by the deflection.

Note that, in the present embodiments, the control is performed in such a manner that the sheet feeding portion 102 stops simultaneously with the separation operation. However, there may be a time lag and the sheet feeding portion 102 stops after the separation operation. In other words, the control may be performed in such a manner that the separation operation is first performed, the sheet feeding portion 102 stops, and then the sheet collecting portion 111 stops.

In the case where the sheet S is not floating in Step S702, the comparing portion 508 of the CPU 506 compares a goal tension with a detected tension value in Step S705. The process proceeds to Step S706 in the case where the detected tension value is lower than the goal tension. In Step S706, the conveyance speed control portion 509 of the CPU 506 increases conveyance speed of the sheet collecting portion 111. On the other hand, in the case where the detected tension value is higher than the goal tension, the process proceeds to Step S707 and the conveyance speed control portion 509 of the CPU 506 slows down the conveyance speed of the sheet collecting portion 111.

The above-described control makes it possible to certainly avoid the contact between the printing heads 114 and the sheet S during the emergency evacuation operation performed when the floating of the sheet S is detected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-103693, filed on Jun. 28, 2022, which is hereby incorporated by reference herein in its entirety.

What is claimed is:

1. A printing apparatus comprising:
- a printing head configured to perform printing on a printing material from a continuous sheet with a roll shape;
- a feeding portion configured to feed the printing material and provided at an upstream side of the printing head with respect to a conveying direction;
- a winding portion configured to wind a part of the printing material into a roll shape and provided at a downstream side of the printing head in the conveying direction;
- a conveying portion configured to convey the printing material, while the printing head is performing printing on the printing material, and provided at a position where the conveying portion is opposed to the printing head;
- a movement mechanism configured to move at least one of the printing head and the conveying portion and change an opposing interval between the printing head and the conveying portion;
- a detecting portion configured to detect floating of the printing material at the upstream side of the printing head, and
- a control portion configured to control the feeding portion and the winding portion in such a manner that a predetermined tension is applied to the printing material,
- wherein the movement mechanism performs a separation operation to widen the opposing interval in a case where the detecting portion detects the floating while the predetermined tension is applied to the printing material, and
- wherein after the separation operation, the winding portion stops winding of the printing material.

2. The printing apparatus according to claim 1, further comprising a tension detecting portion configured to detect tension of the printing material that is being conveyed,
wherein the detecting portion is disposed between the feeding portion and the winding portion.

3. The printing apparatus according to claim 1,
wherein the control portion performs a conveyance stop operation, the conveyance stop operation being an operation to stop feeding of the printing material by the feeding portion and stop winding of the printing material by the winding portion.

4. The printing apparatus according to claim 1,
wherein, in the conveyance stop operation, the control portion stops the feeding and then stops the winding.

5. The printing apparatus according to claim 1,
wherein the separation operation is an operation to move the conveying portion in a direction away from the printing head.

6. The printing apparatus according to claim 1,
wherein the separation operation is an operation to move the printing head in a direction away from the conveying portion.

7. The printing apparatus according to claim 1,
wherein the separation operation is an operation to move the conveying portion in a direction away from the printing head and move the printing head in a direction away from the conveying portion.

8. The printing apparatus according to claim 1, further comprising a meander correcting portion configured to correct a meander of the printing material, the meander correcting portion being disposed between the feeding portion and the printing head in the conveying direction,
wherein the detecting portion is disposed between the meander correcting portion and the printing head in the conveying direction.

9. The printing apparatus according to claim 1,
wherein the detecting portion includes:
- a light emitting portion configured to emit detection light above the printing material and along a conveyance path of the printing material; and
- a light receiving portion configured to receive the detection light, and the detecting portion detects the floating by change in amount of light received by the light receiving portion.

10. The printing apparatus according to claim 1,
wherein the conveying portion includes:
- a supporting member configured to support the printing material at a position opposed to the printing head; and
- a conveyance roller that is rotatably disposed at a position adjacent to the supporting member along a conveyance path of the printing material.

11. The printing apparatus according to claim 1,
wherein the detecting portion includes an ultrasound sensor.

* * * * *